United States Patent
Nozaki

(10) Patent No.: US 6,464,293 B2
(45) Date of Patent: Oct. 15, 2002

(54) SEALING STRUCTURE FOR SEALING AROUND GLASS LID FOR SUN ROOF

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/837,384

(22) Filed: Apr. 19, 2001

(65) Prior Publication Data

US 2001/0033097 A1 Oct. 25, 2001

(30) Foreign Application Priority Data

Apr. 21, 2000 (JP) ........................................ 2000-120263

(51) Int. Cl.⁷ ................................................ B60J 10/10
(52) U.S. Cl. ................................ 296/216.09; 49/489.1
(58) Field of Search ....................... 296/216.06, 216.09; 49/489.1, 498.1

(56) References Cited

U.S. PATENT DOCUMENTS

| | | | | |
|---|---|---|---|---|
| 4,765,677 A | * | 8/1988 | Nagato | 296/216.09 |
| 4,925,237 A | * | 5/1990 | Bohm et al. | 296/216.09 |
| 5,170,587 A | | 12/1992 | Nakatani et al. | |
| 5,366,267 A | | 11/1994 | Nozaki | |
| 5,449,544 A | | 9/1995 | Ogawa et al. | |
| 5,538,317 A | * | 7/1996 | Brocke et al. | 296/216.09 |
| 5,992,238 A | * | 11/1999 | Kato et al. | 296/216.09 |

FOREIGN PATENT DOCUMENTS

| | | |
|---|---|---|
| DE | 3527541 A1 | 2/1987 |
| EP | 0 978 399 A1 | 2/2000 |
| GB | 2206918 A | 1/1989 |
| GB | 2209181 A | 5/1989 |
| JP | 401215622 * | 8/1989 ............ 296/216.09 |

* cited by examiner

*Primary Examiner*—Dennis H. Pedder
(74) *Attorney, Agent, or Firm*—Pillsbury WInthrop LLP

(57) ABSTRACT

A sealing structure for sealing around a glass lid of a sun roof of a motor vehicle has a frame member composed of synthetic resin, which is attached to a periphery of the glass lid, and a weather strip which is attached to an outer periphery of the frame member. An upper surface of the frame member is positioned lower than an upper surface of the glass lid, and a seal wall of the weather strip extends to cover the upper surface of the frame member. And preferably, an end of an extended seal wall of the seal wall abuts a peripheral end surface of the glass lid such that an upper surface of the extended seal wall is flush with the upper surface of the glass lid.

6 Claims, 3 Drawing Sheets

SEALING STRUCTURE FOR SEALING AROUND GLASS LID FOR SUN ROOF

CROSS-REFERENCE TO RELATED APPLICATION

This application is related to and claims priority from Japanese Patent Application No. 2000-120263, incorporated herein by reference.

BACKGROUND OF THE INVENTION

1. Field of the Invention

The present invention relates to a sealing structure for sealing between a periphery of a glass lid and a roof opening portion of a sun roof of a motor vehicle.

2. Description of Related Art

As illustrated in FIG. 1, an opening 10 is provided in a roof 12 of a motor vehicle, and a glass lid 14 is slidably or tiltably mounted on the roof 12 to open and close the opening 10. To seal between a periphery of the glass lid 14 and a roof opening portion around the opening 10 of the roof 12, a weather strip (not shown) is attached to the periphery of the glass lid 14.

FIG. 2 illustrates a typical example of conventional sealing structures. A frame member 16 composed of synthetic resin is attached to a periphery of the glass lid 14, and a weather strip 18 composed of rubber is attached to the frame member 16. The periphery of the glass lid 14 is fitted into a channel 20 having a U-shaped cross-section, which is formed in an inside surface of the frame member 16. The weather strip 18 has a base portion 22 and a seal wall 24 which defines a tubular seal portion with the base portion 22. The base portion 22 is fitted on a projection 26 formed in an outer periphery of the frame member 16 (U.S. Pat. No. 4,925,237).

The above-described conventional sealing structure, however, has the problem that a level difference (H) exists between an upper surface of the frame member 16 and an upper surface of the glass lid 14 to cause a discontinuity of surface around the glass lid 14, and a color difference also exists between the synthetic resin frame member 16 and the rubber weather strip 18 to cause a lack of unity in appearance around the glass lid 14.

The frame member 16 is composed of polyvinylchloride, for example, which exhibits comparatively good weather resistance among other synthetic resins. But, the weather resistance of polyvinylchloride is inferior to that of EPDM rubber which has been generally used as the material for weather strips. When the roof 12 is exposed to direct sunlight in summer or other hot seasons, the frame member 16 is gradually degraded due to high temperatures, and cracks are generated in the surface thereof.

In another conventional sealing structure, a frame member is attached to a periphery of a glass lid such that an upper surface thereof is flush with an upper surface of the glass lid (U.S. Pat. No. 6,099,779). This sealing structure, however, exhibits the problems such as the color difference between the frame member and the weather strip, and the degradation of the frame member due to exposure to high temperature sunlight.

SUMMARY OF THE INVENTION

Accordingly, it is an object of the present invention to provide a sealing structure for sealing around a glass lid for a sun roof, which is free from the degradation of a synthetic resin frame member attached to a periphery of the glass lid, due to high temperature sunlight, and improves the external view of the sun roof around the glass lid.

In accordance with the present invention, the sealing structure for sealing between a periphery of a glass lid and a roof opening portion around an opening of a sun roof of a motor vehicle has a frame member composed of synthetic resin, which is attached to the periphery of the glass lid, and a weather strip composed of rubber, which is attached to an outer periphery of the frame member. The frame member is attached such that an upper surface thereof is positioned lower than an upper surface of the glass lid. The weather strip has a base portion to be secured to the outer periphery of the frame member, and a seal wall for defining a tubular seal portion with the base portion thereof, and coming into pressurized contact with the roof opening portion of the sun roof. The seal wall extends from an upper end of the base portion to cover the upper surface of the frame member, and an end of an extended seal wall abuts a periphery of the glass lid, and preferably abuts to be flush with the upper surface thereof.

With the present invention, the upper surface of the frame member of synthetic resin is covered with the extended seal wall of the weather strip, resulting in the problems such as the degradation of the frame member due to high temperature sunlight, and the color difference between the frame member and weather strip being solved. In addition, since the extended seal wall of the weather strip covers the upper surface of the frame member which is positioned lower than the upper surface of the glass lid, the upper surface of the seal wall can be made flush with the upper surface of the glass lid, resulting in the appearance around the glass lid being improved.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
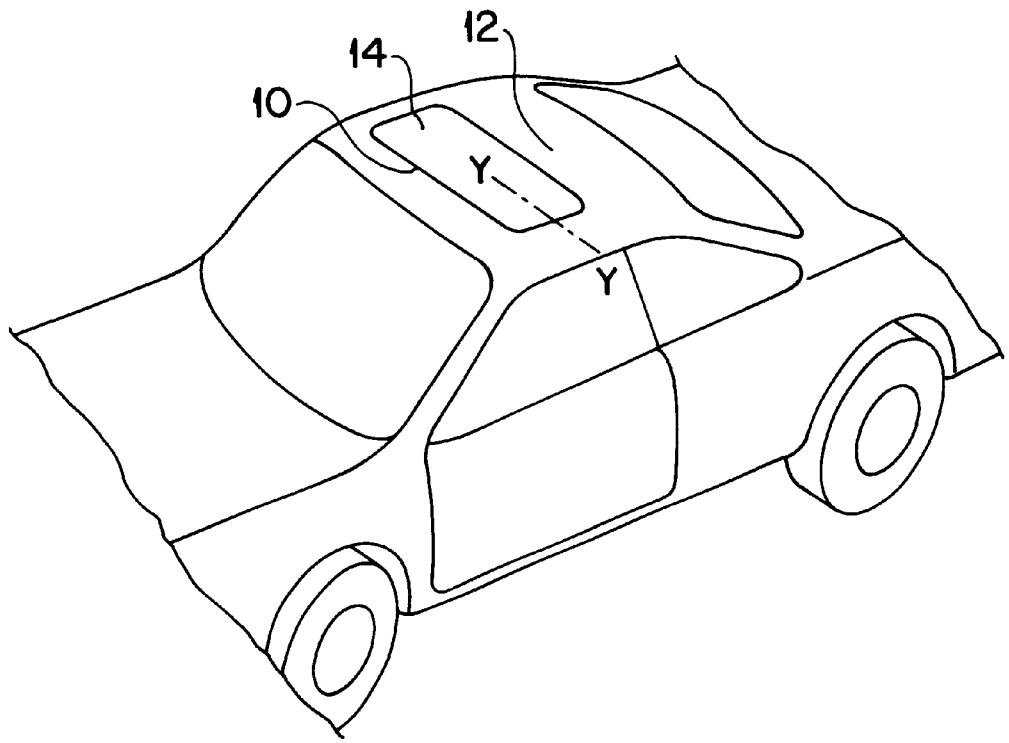
FIG. 1 is a perspective view of a sun roof of a motor vehicle.
Figure 2:
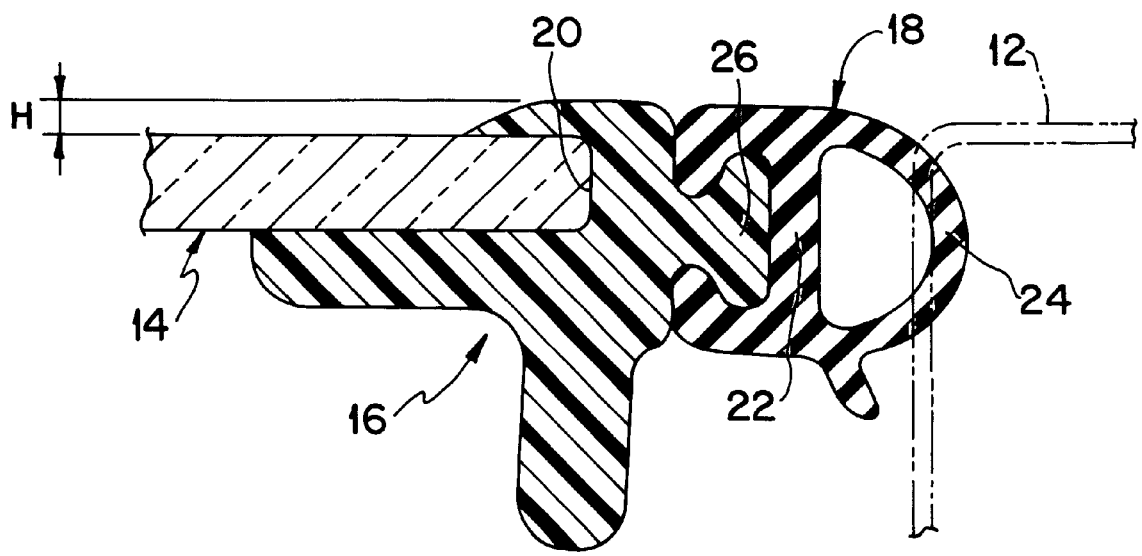
FIG. 2 is a cross-sectional view of a conventional sealing structure, which is taken along the line Y—Y of FIG. 1.

As shown in FIG. 1, a substantially rectangular roof opening 10 is formed in a roof 12 of a motor vehicle, and a glass lid 14 is slidably mounted. By sliding the glass lid 14 rearwardly along a lower surface of the roof 12, the roof opening 10 is opened, and by sliding the glass lid 14 frontwardly, the roof opening 10 is closed. The glass lid 14 is composed of a glass plate or a synthetic resin plate.

Figure 3:
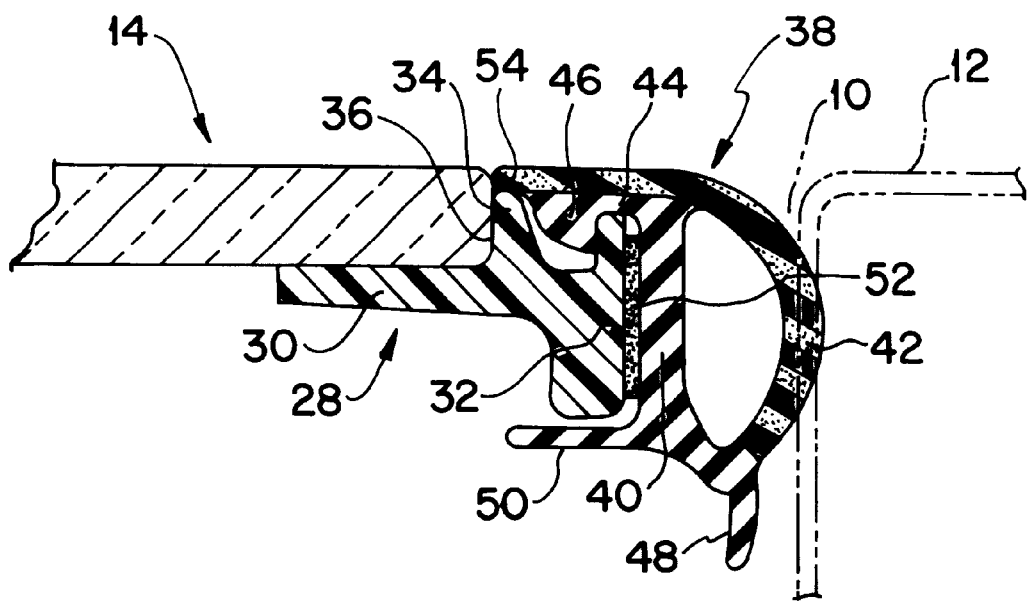
FIG. 3 is a cross-sectional view of a first embodiment of a sealing structure in accordance with the present invention, which is taken along the line Y—Y of FIG. 1.

As shown in FIG. 3, a frame member 28 is attached to a periphery of the glass lid 14. The frame member 28 has a base portion 30 to be attached along a lower surface of the glass lid 14, and a peripheral wall 32 which vertically extends from an outside end of the base portion 30, thus forming a generally T-shaped cross-section. A vertical projection 34 is formed in about the middle of the base portion 30 to define an L-shaped inside surface therewith. The L-shaped inside surface is bonded to both a peripheral end surface 36 of the glass lid 14 and the lower surface thereof. The vertical projection 34 is formed to have a height less than the thickness of the glass lid 14 such that a projecting end of the vertical projection 34 is positioned lower than the upper surface of the glass lid 14 when mounted.

The frame member 28 is attached to the glass lid 14 by previously applying an adhesive to the peripheral end surface 36 of the glass lid 14 and the lower surface of a peripheral portion thereof, placing the peripheral portion of the glass lid 14 in a mold, and injecting a synthetic resin into the mold.

A weather strip 38 has a base portion 40 composed of an EPDM solid rubber and a seal wall 42 composed of an EPDM sponge rubber. The base portion 40 is attached to an outside surface of the peripheral wall 32 of the frame member 28. The seal wall 42 expands outwardly into an arc-shaped cross-section to define a tubular seal portion having a D-shaped cross-section with the base portion 40. The seal wall 42 is adapted to come into pressurized contact with the roof opening portion around the roof opening 10. The base portion 40 and seal wall 42 are integrally formed by extrusion.

An upper end of the base portion 40 is bent and extends inwardly to form an extension 44, and an end of the extension 44 projects downwardly to form a projecting edge 46. A lower end of the base portion 40 extends obliquely downwardly, and further projects downwardly to form a lip 48. The lower end of the base portion 40 also extends inwardly to form another extension 50 in a facing relationship with the extension 44.

A lower end of the seal wall 42 is joined to a lower outside edge of the base portion 40, and an upper end of the seal wall 42 extends inwardly to cover the upper surface of the extension 44 of the base portion 40 and is joined thereto. And an extended seal wall 54 further extends inwardly of the extension 44 by a short length.

The weather strip 38 thus arranged is attached to the frame member 28 over the entire length thereof by engaging the projecting edge 46 of the base portion 40 with an upper end of the peripheral wall 32 of the frame member 28, and bonding the inside surface of the base portion 40 of the weather strip 38 to the outside surface of the peripheral wall 32 of the frame member 28 with a double-sided adhesive tape 52.

The extended seal wall 54 abuts and covers the projecting end of the vertical projection 34 of the frame member 28, which is positioned lower than the upper surface of the glass lid 14. An end of the extended seal wall 54 abuts the peripheral end surface 36 of the glass lid 14. The level difference between the upper surface of the glass lid 14 and the upper end of the vertical projection 34 is determined substantially equal to the thickness of the extended seal wall 54. Consequently, the upper surface of the extended seal wall 54 becomes flush with the upper surface of the glass lid 14. The extended seal wall 54 projects inwardly of the extension 44 of the base portion 40 by a length slightly greater than the distance between the extension 44 and the facing peripheral end surface 36 of the glass lid 14. The end of the extended seal wall 54 abuts the peripheral end surface 36 of the glass lid 14 in its compressed state.

When the glass lid 14 is slid frontwardly to close the roof opening 10 of the roof 12, the seal wall 42 of the weather strip 38 comes into close contact with the roof opening portion around the roof opening 10 to seal a gap between the roof opening portion and the periphery of the glass lid 14. In the case of high pressure washing water, for example, leaks between the roof opening portion and the seal wall 42 of the weather strip 38, the lip 48 of the weather strip 38 guides the water into a drain (not shown) provided under the lip 48.

With the sealing structure thus arranged, the frame member 28 of synthetic resin is covered with the extended seal wall 54 of the weather strip 38 and is concealed from an external view. Consequently the degradation of the frame member 28 due to strong direct sunlight is prevented. The upper surface of the extended seal wall 54 is approximately flush with the upper surface of the glass lid 14, resulting in no level difference existing around the glass lid 14. In addition, any border line due to the color difference is not formed between the frame member 28 and weather strip 38. Consequently, the appearance quality around the glass lid 14 is improved.

Figure 4:
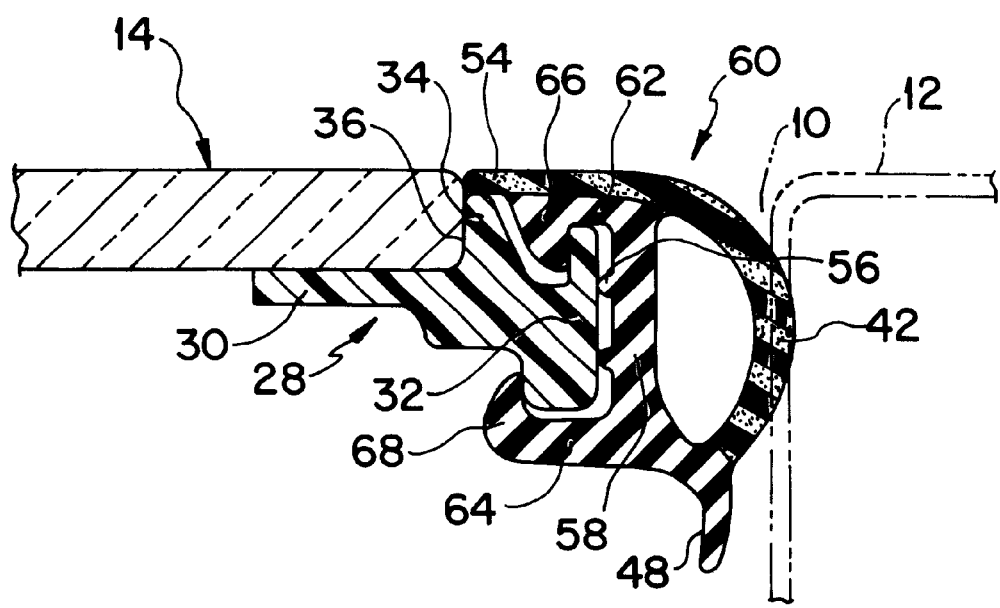
FIG. 4 is a cross-sectional view of a second embodiment of a sealing structure in accordance with the present invention, which is taken along the line Y—Y of FIG. 1.

FIG. 4 illustrates a second embodiment of the present invention. The second embodiment differs from the first embodiment in the structure for attaching the base portion of the weather strip to the frame member. As shown, plural lines of beads 56 are formed in an inside surface of a base portion 58 of a weather strip 60 so as to extend in a longitudinal direction of the base portion 58. Extensions 62 and 64, each having a projecting edge 66 or 68, are formed at upper and lower ends of the base portion 58 so as to vertically face each other. The remainder of the structure of the weather strip of the second embodiment is identical to that of the first embodiment. In FIG. 4, parts similar to those in FIG. 3 are given the same number as in FIG. 3.

The base portion 58 of the weather strip 60 is attached to the frame member 28 by pressing the beads 56 formed in the base portion 58 against the outside surface of the peripheral wall 32 of the frame member 28 to engage the projecting edges 66 and 68 with upper and lower ends of the peripheral portion 32.

The sealing structure of the second embodiment achieves the operational advantages similar to those of the preceding embodiment.

With the sealing structure of the first and second embodiments, the frame member of synthetic resin, which is attached to the periphery of the glass lid, is not exposed to external view so that neither degradation nor cracking due to high temperature sunlight occurs in the frame member. And the seal wall of the weather strip abuts the peripheral end surface of the glass lid directly so as to be flush with the upper surface of the glass lid. Accordingly, the color quality and configuration around the glass lid become simple to improve the appearance quality of the sun roof.

Figure 5:
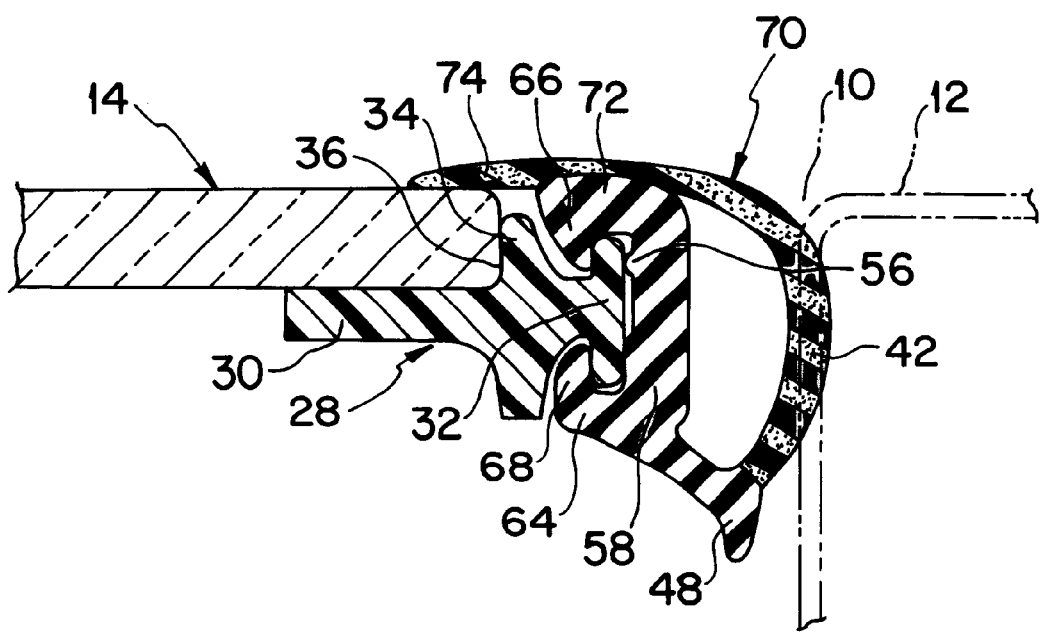
FIG. 5 is a cross-sectional view of a third embodiment of a sealing structure in accordance with the present invention, which is taken along the line Y—Y of FIG. 1.

FIG. 5 illustrates a third embodiment of the present invention. The third embodiment differs from the second embodiment in that an end of an extended seal wall of a weather strip abuts an upper surface of a peripheral portion of a glass lid.

As shown, an upper end of the base portion 58 and an upper surface of an extension 72 which extends inwardly from the base portion 58 are positioned on approximately the same level with an upper surface of the glass lid 14. And an end portion of an extended seal wall 74 which covers the extension 72 covers and closely contacts the upper surface of the peripheral portion of the glass lid 14. The remainder of the structure of the weather strip 70 of the third embodiment is identical to that of the second embodiment. In FIG. 5, parts similar to those in FIG. 4 are given the same number as in FIG. 4.

The sealing structure of the third embodiment achieves the operational advantages similar to those of the preceding first and second embodiments except that a level difference exists between the extended seal wall 74 of the weather strip 70 and the glass lid 14.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure for sealing between a roof opening portion around a roof opening formed in a sun roof of a motor vehicle and a periphery of a glass lid for opening and closing the roof opening, comprising:

a frame member composed of synthetic resin, which is attached to a lower surface of the periphery of the glass lid and a peripheral end surface thereof such that an uppermost surface of said frame member is positioned lower than an upper surface of the glass lid; and a weather strip attached to an outer periphery of said frame member, said weather strip having a base portion to be secured to said frame member and a seal wall for defining a tubular seal portion with said base portion, which seal wall extends outwardly of said base portion and is adapted to come into pressurized contact with the roof opening portion around the roof opening, said seal wall having an extended seal wall which extends inwardly from an upper end of said base portion toward the periphery of the glass lid and which covers said frame member, thereby concealing the uppermost surface of said frame member from external view.

2. A sealing structure as claimed in claim 1, wherein an end of said extended seal wall abuts a peripheral end surface of the glass lid.

3. A sealing structure as claimed in claim 1, wherein an end of said extended seal wall abuts an upper surface of the periphery of the glass lid.

4. A sealing structure as claimed in claim 1, wherein said frame member includes a base portion, a peripheral wall which is vertically formed at an outside end of said base portion to have a T-shaped cross-section with said base portion, and a vertical projection which projects from about the middle of said base portion by a height less than the thickness of the glass lid, said frame member is attached to the glass lid such that said vertical projection is secured to the peripheral end of the glass lid, and said base portion of said frame member is secured to a lower surface of the periphery of the glass lid, said base portion of said weather strip is secured to said peripheral wall of said frame member, said extended seal wall of said weather strip extends from an upper end of said base portion of said weather strip toward the glass lid, and an end of said extended seal wall abuts the peripheral end surface of the glass lid while abutting and covering a projecting end of said vertical projection.

5. A sealing structure as claimed in claim 1, wherein said frame member includes a base portion, a peripheral wall which is vertically formed at an outside end of said base portion to have a T-shaped cross-section with said base portion, and a vertical projection which projects from about the middle of said base portion by a height less than the thickness of the glass lid, said frame member is attached to the glass lid such that said vertical projection is secured to the peripheral end of the glass lid, and said base portion of said frame member is secured to a lower surface of the periphery of the glass lid, said base portion of said weather strip is secured to said peripheral wall of said frame member, said extended seal wall of said weather strip extends from an upper end of said base portion of said weather strip toward the glass lid, and an end of said extended seal wall abuts the upper surface of the periphery of the glass lid while abutting and covering a projecting end of said vertical projection.

6. A sealing structure as claimed in claim 4, wherein said projecting end of said vertical projection of said frame member is positioned lower than the upper surface of the glass lid by the thickness of said extended seal wall such that an upper surface of said extended seal wall of which an end abuts the peripheral surface of the glass lid is flush with the upper surface of the glass lid.

* * * * *